(12) United States Patent
Duffy

(10) Patent No.: US 12,050,878 B2
(45) Date of Patent: Jul. 30, 2024

(54) HANDWRITING TEXT SUMMARIZATION

(71) Applicant: SOCIETE BIC, Clichy (FR)

(72) Inventor: David Duffy, Zurich (CH)

(73) Assignee: SOCIÉTÉ BIC, Clichy (FR)

( * ) Notice: Subject to any disclaimer, the term of this patent is extended or adjusted under 35 U.S.C. 154(b) by 267 days.

(21) Appl. No.: 17/581,730

(22) Filed: Jan. 21, 2022

(65) Prior Publication Data
US 2022/0269869 A1 Aug. 25, 2022

(30) Foreign Application Priority Data
Feb. 19, 2021 (EP) .................................. 21305204

(51) Int. Cl.
*G06F 40/40* (2020.01)
*G06F 16/34* (2019.01)
*G06V 30/226* (2022.01)

(52) U.S. Cl.
CPC ............ *G06F 40/40* (2020.01); *G06F 16/345* (2019.01); *G06V 30/2268* (2022.01)

(58) Field of Classification Search
CPC .... G06F 40/40; G06F 16/345; G06V 30/2268
See application file for complete search history.

(56) References Cited

U.S. PATENT DOCUMENTS

| 10,152,472 | B2* | 12/2018 | Park | G06F 40/258 |
| 2004/0034835 | A1* | 2/2004 | Kuruoglu | G06F 40/169 |
| | | | | 715/230 |
| 2004/0122657 | A1 | 6/2004 | Brants et al. | |
| 2006/0121424 | A1* | 6/2006 | Ford | G09B 19/00 |
| | | | | 434/236 |
| 2017/0052696 | A1* | 2/2017 | Oviatt | G06F 3/04883 |
| 2017/0068436 | A1* | 3/2017 | Auer | G06F 3/04883 |
| 2017/0068445 | A1* | 3/2017 | Lee | G06F 40/171 |

(Continued)

OTHER PUBLICATIONS

Asai et al., "EA snippets: Generating summarized view of handwritten documents based on emphasis annotations." Human Interface and the Management of Information. Information and Knowledge in Applications and Services: 16th International Conference, HCI International 2014, Proceedings. (Year: 2014).*

(Continued)

*Primary Examiner* — Brian L Albertalli
(74) *Attorney, Agent, or Firm* — Bookoff McAndrews, PLLC

(57) ABSTRACT

The present disclosure relates to a computer-implemented method for handwriting-to-text-summarization, comprising obtaining, via a user interface of a system, a handwriting input representing a handwriting of a user of the system for handwriting-to-text-summarization, recognizing a text in the handwriting input, extracting at least one dynamic feature of the handwriting from the handwriting input, generating a text summary of the text, wherein generating the text summary is based on the text and on the at least one dynamic feature of the handwriting. The present disclosure also relates to a system for handwriting-to-text-summarization, comprising a user interface comprising a capturing subsystem configured to capture a handwriting of a user of the system, and wherein the system is configured to run the method for handwriting-to-text-summarization.

20 Claims, 6 Drawing Sheets

(56) References Cited

U.S. PATENT DOCUMENTS

2018/0005082 A1* 1/2018 Bluche ............. G06V 30/18057
2020/0394364 A1* 12/2020 Venkateshwaran ... G06F 40/117
2022/0253605 A1* 8/2022 Tan ................... G06Q 10/1095

OTHER PUBLICATIONS

Asai, Hiroki, Takanori Ueda, and Hayato Yamana. "Legible thumbnail: summarizing on-line handwritten documents based on emphasized expressions." Proceedings of the 13th International Conference on Human Computer Interaction with Mobile Devices and Services. 2011. (Year: 2011).*
Extended European Search Report issued on Aug. 31, 2021 in counterpart European Patent Application No. 21305204.6.
Oviatt, Sharon, et al. "Dynamic handwriting signal features predict domain expertise." ACM Transactions on Interactive Intelligent Systems (TiiS) 8.3 (2018): 1-21.
Tur, Gokhan, et al. "The CALO meeting assistant system." IEEE Transactions on Audio, Speech, and Language Processing 18.6 (2010): 1601-1611.
Han, Jiawen, et al. "Sentiment pen: Recognizing emotional context based on handwriting features." Proceedings of the 10th Augmented Human International Conference 2019. 2019.

* cited by examiner

HANDWRITING TEXT SUMMARIZATION

CROSS REFERENCE TO RELATED APPLICATIONS

This application claims priority from European patent application No. 21305204.6, filed on Feb. 19, 2021, the contents of which are hereby incorporated herein in their entirety by this reference.

TECHNICAL FIELD

This specification relates to a computer-implemented method for handwriting-to-text-summarization and to a system for handwriting-to-text-summarization.

BACKGROUND

Automatic summarization is the process of shortening a text computationally, thereby generating a text summary that represents (the most) important or relevant information within the original content of the text. As an example, extraction-based summarization relies on classifying the importance of sections of the text, usually at the sentence level. Once all sentences have been classified, the important ones are extracted and composed into the shorter text summary. Various techniques exist for successfully capturing the general importance of a sentence to broader understanding of the text, ranging from simpler methods such as calculating the density of uncommon words to semantic analysis of each sentence. In examples, abstraction-based summarization involves natural language processing to build an internal semantic representation of the original content of the text from which a condensed text summary is generated that is likely to be close to how a human might summarize the text.

Retaining dynamic features of handwriting of a user allows for assessing the user based on non-textual (or non-verbal) contents of her or his written input. In fact, as an example, it is known that dynamic features such as measures of stroke distance, applied pressure and stroke duration extracted from the user writing by hand e.g. in a digital pen system can be used to estimate the expertise/level of competence of the user in the domain she or he is writing about. Along the same lines, it is possible to infer other attributes such as a level of confidence, an age of the user, and/or a given emotional state of the user from her or his handwriting. While some of the dynamic features may easily be interpreted by a human reader, pre-trained machine learning algorithms are capable of also assessing subtler dynamic features.

In recent years, means of style transfer have evolved in the realm of natural language processing. Style transfer aims at changing a style of a text while maintaining its linguistic meaning. As an example, a text written in an impolite style (e.g. an online review) can be converted to another text conveying the same message but cast into a neutral or polite style. Such transformations may rely on auto-encoders which can be a class of neural networks (style transfer networks) configured to create in an encoding step a reduced and/or abstract representation of the text that is to be mapped in a decoding step to an output text. In contrast to standard auto-encoders that are trained by providing the input text also as the output text, auto-encoders for style transfer are trained by providing style-transformed input texts as the output texts.

SUMMARY

According to a first aspect, there is provided a computer-implemented method for handwriting-to-text-summarization. The method comprises obtaining, via a user interface of a system, a handwriting input representing a handwriting of a user of the system for handwriting-to-text-summarization. The method further comprises recognizing a text in the handwriting input. The method further comprises extracting at least one dynamic feature of the handwriting from the handwriting input. The method further comprises generating a text summary of the text. Generating the text summary is based on the text and on the at least one dynamic feature of the handwriting.

According to a second aspect, there is provided a system for handwriting-to-text-summarization. The system comprises a user interface comprising a capturing subsystem configured to capture a handwriting of a user of the system. The system is configured to run the method of the first aspect (or an embodiment thereof) for handwriting-to-text-summarization.

Dependent embodiments of the aforementioned aspects are given in the dependent claims and explained in the following description, to which the reader should now refer.

Handwriting-to-text-summarization incorporates both importance assessment of the text or portions (e.g. sentences/words) thereof and qualities of the text or the portions thereof indicated by dynamic handwriting features that reveal information about the user, such as e.g. the level of competence. In so doing, the handwriting-to-text-summarization uses, retains and/or reflects such information about the user, thereby yielding a text summary which is more sensitive to subtle and/or invisible user input. Such may lead to a better and more accurate text summary. In fact, as an example, in case a sentence is rated to have been written with a low level of competence, it may not be included in the text summary.

Furthermore, handwriting-to-text-summarization may help to draw the attention of the user as well as of a third party (e.g. a parent and/or a teacher) to particular education needs, such as identifying gaps in knowledge and/or understanding. In fact, generating the text summary of the text may depend on settings that the user or the third party (even after completion of the user's handwriting) may adjust. As an example, such settings can be used to generate a text summary that deliberately features and/or highlights portions of the text that correspond to low level of competence and/or low level of confidence of the user. Such may allow a teacher to efficiently identify the aforementioned gaps. Hence, the system for handwriting-to-text-summarization can be used as a means in education and/or teaching.

In addition, a set of routines may run on the generated text summary to accomplish goals such as style transfer, font modification, and/or annotation. In fact, the language can be adjusted to match psychological or educational information retrieved from handwriting dynamics, thus making this information more obvious to readers (i.e. the user or the third party). Such routines/information may again be used to identify gaps in knowledge and/or understanding. Along the same lines, the text summary may be automatically annotated according to information from handwriting dynamics, and thus not requiring teachers or students to have to do in-depth analysis of their knowledge gaps. Annotations may be interactive, e.g. in terms of hyperlinks encoding a request to a search engine on the web.

In general, note taking while following an event such as e.g., a lecture or a business meeting is typically a lossy process in that given the somewhat limited multitasking capabilities of a human brain there can be a trade-off between jottings things down and digesting newly incoming content or interacting in the event. As an example, that may lead to a suboptimal timing of writing versus listening/ talking which may hamper future use of the notes rendering them less telling and thus less beneficial to the user in the long run. However, text summaries from multiple users attending the same event (e.g. the lecture or the business meeting) and each jotting down notes in a system for handwriting-to-text-summarization may be collated based on the information about the users such as e.g. their level of competence/domain expertise, so that the resulting collated text summary represents an expertise level which can be higher than any one of the individual text summaries of the multiple users. In so doing, collated handwriting-to-text-summarization (e.g. via a network of systems for handwriting-to-text-summarization) can be seen as a means for collective/crowd intelligence improving the text summary.

FIGURES DESCRIPTION

FIG. 1 schematically illustrates a computer-implemented method according to the first aspect (or an embodiment thereof) for handwriting-to-text-summarization.

FIG. 2 schematically illustrates a system according to the second aspect (or an embodiment thereof) for handwriting-to-text-summarization.

FIG. 3 schematically illustrates an embodiment of the computer-implemented method according to the first aspect.

DETAILED DESCRIPTION

Figure 4:
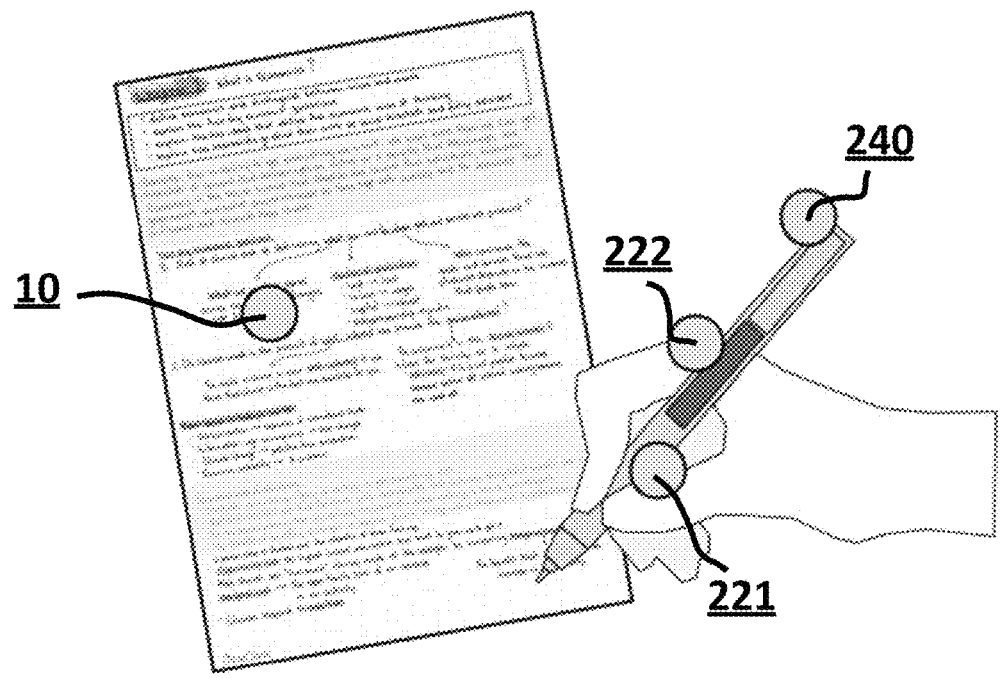
FIG. 4 illustrates an example for handwriting-to-text-summarization.
Figure 4:
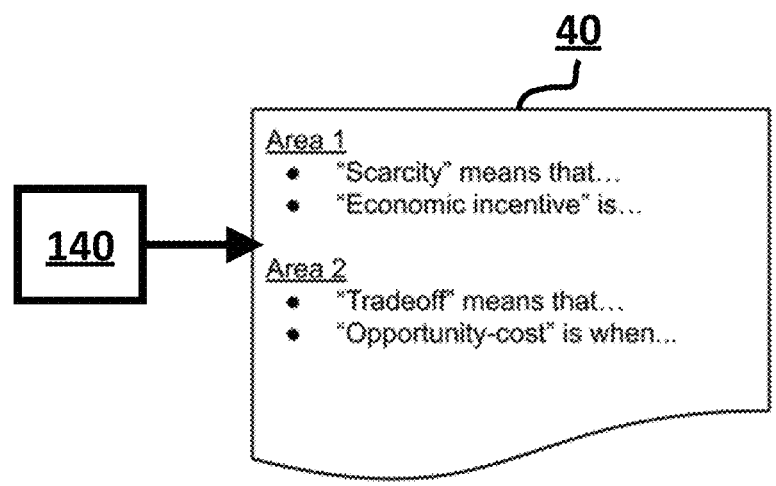

The method 100 of the first aspect (or an embodiment thereof) and the system 200 of the second aspect (or an embodiment thereof) aim at providing functionality for handwriting-to-text-summarization. As an example, as shown in FIG. 4, a user of the system 200 may use a writing utensil 221 such as e.g. a digital pen or a smart pen to capture a handwriting input 10 that is to be summarized in terms of a text summary 40.

Figure 1:
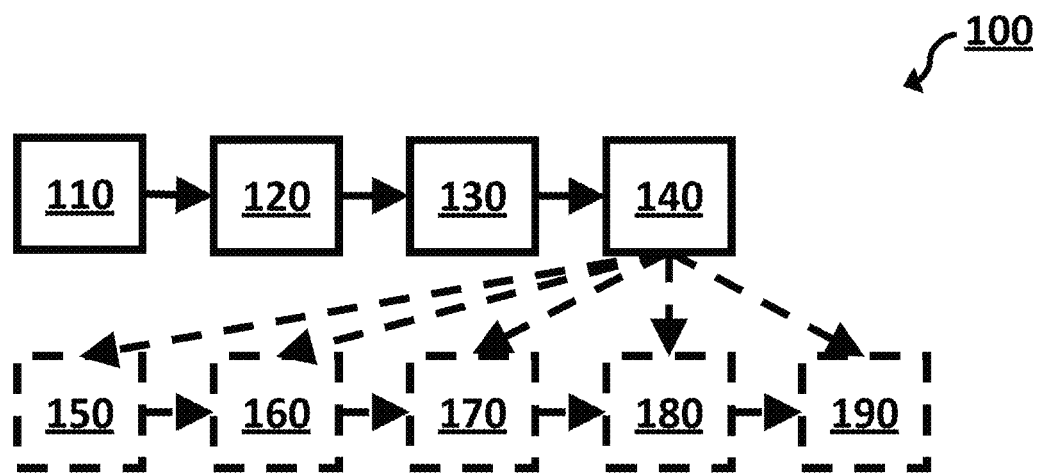

The computer-implemented method 100 for handwriting-to-text-summarization comprises obtaining 110, via a user interface 210 of a system 200, a handwriting input 10 representing a handwriting of a user of the system 200 for handwriting-to-text-summarization. The method further comprises recognizing 120 a text 20 in the handwriting input 10. The method further comprises extracting 130 at least one dynamic feature 30 of the handwriting from the handwriting input 10. The method further comprises generating 140 a text summary 40 of the text 20. Generating 140 the text summary 40 is based on the text 20 and on the at least one dynamic feature 30 of the handwriting. The computer-implemented method 100 is schematically illustrated in FIG. 1 and an embodiment thereof in FIG. 3. The text 20 may be given in terms of a character encoding, e.g. in plain text ASCII.

The one or more dynamic features 30 may comprise or be an average writing pressure, an average stroke length, and/or an average stroke duration, wherein averaging is over the text 20 or portions thereof. As an example, a dynamic feature 30 is an average writing pressure. Alternatively, or in addition, the dynamic feature 30 or another dynamic feature 30 is an average stroke length. Alternatively, or in addition, the dynamic feature 30 or yet another dynamic feature 30 is an average stroke duration. The text 20 can be semantically and/or linguistically interpretable with respect to at least one communication language.

The handwriting input 10 may comprise a first set of data representing the text. As an example, the first set of data may comprise at least one time series (or at least one vector) of stroke data captured by a capturing system 220 of the system 200 for handwriting-to-text-summarization. The first set of data may represent the text 20, if the text 20 written by the user of the system 200 in terms of his or her handwriting can be reproduced from the first set of data, e.g. from the one or more time series (or vectors) of stroke data. Furthermore, the handwriting input 10 may comprise a second set of data representing properties of the handwriting that indicate information about the user as handwriting progresses. As an example, the second set of data representing properties of the handwriting may be at least one time series (or at least one vector) of pen pressure or pressure on a touchpad. The information about the user may relate to an emotional state, an age, a level of confidence, and/or a level of competence (viz. domain expertise) of the user. The first set of data and the second set of data overlap or are identical.

Recognizing 120 the text 20 in the handwriting input 10 may comprise applying the handwriting input 10 (e.g. the first set of data) to a text pre-processing algorithm configured to recognize the text 20 represented by the handwriting input 10. Furthermore, the text pre-processing algorithm can be further configured to segment 121 the text 20 into one or more portions. As an example, such a segmentation may follow from an analysis of punctuation marks (periods, colons, semi-colons, commas) and/or indentation and/or bullet points. The order of the portions can be maintained. In examples, portions can be enumerated in their original order so that their original order can be reproduced any time. In fact, the one or more portions can be enumerated as they appear in the text. Alternatively, or in addition, the one or more portions can be timestamped. As an example, the one or more portions (of the text 20) may be sentences, clauses, and/or phrases (of the text 20).

The text pre-processing algorithm may comprise or be a machine-learning algorithm pre-trained for handwriting-to-text recognition and/or text segmentation. The text pre-processing algorithm may be configured to segment the first set of data into individual character vectors and apply a pre-determined vector-to-character mapping to output the text.

The text pre-processing algorithm may be further configured to store the text 20 in a database. Furthermore, the text pre-processing algorithm may be further configured to store the one or more portions of text 20 (and information about their order, e.g. their enumeration and/or timestamps) in the database. The database may or may not form part of the system 200. In the latter case, the database can be hosted on a server (e.g. in a cloud). Saving the text 20 and/or the portions thereof (and information about their order) in the database allows for reuse of the text 20. As an example, such can be useful when collating 180 text summaries 40 of various users.

Extracting 130 the at least one dynamic feature 30 of the handwriting from the handwriting input 10 may comprise applying the handwriting input 10 to a handwriting dynamics algorithm configured to extract the at least one dynamic feature 30 from the handwriting input 10. The handwriting dynamics algorithm may be further configured to compute at least one dynamic feature 30 for each portion of the text. The handwriting dynamics algorithm may be further configured to compute the average writing pressure, the average stroke length, and/or the average stroke duration, wherein averaging is over the text 20 or portions (e.g. sentences) thereof, thereby producing the one or more dynamic features 30 for the text 20 or for each portion thereof. Computing the average writing pressure, the average stroke length, and/or the average stroke duration may be based on the second set of data.

The handwriting dynamics algorithm can be further configured to store the one or more dynamic features 30 for the text 20 in the database. The handwriting dynamics algorithm may be further configured to store the one or more dynamic features 30 for each portion of the text 20 (and information about the order of the portions, e.g. their enumeration or timestamps) in the database.

As an example, the text 20 and the one or more dynamic features 30 can be stored in terms of a data structure of text (and/or portions of text) and corresponding one or more dynamic features.

Generating 140 the text summary 40 of the text 20 based on the text 20 and on the at least one dynamic feature 30 of the handwriting may comprise applying the text 20 and the one or more dynamic features 30 to a text summarization algorithm configured to generate the text summary 40 of the text 20. The text summarization algorithm may comprise or be a natural language processing machine-learning algorithm pre-trained for automatic summarization such as e.g. extraction-based or abstraction-based text summarization. Extraction-based or abstraction-based text summarization can be extended in that, in the training of the natural language processing machine-learning algorithm, the one or more dynamic features 30 can be provided as additional input data (in addition to the text 20 or its portions).

Figure 3:
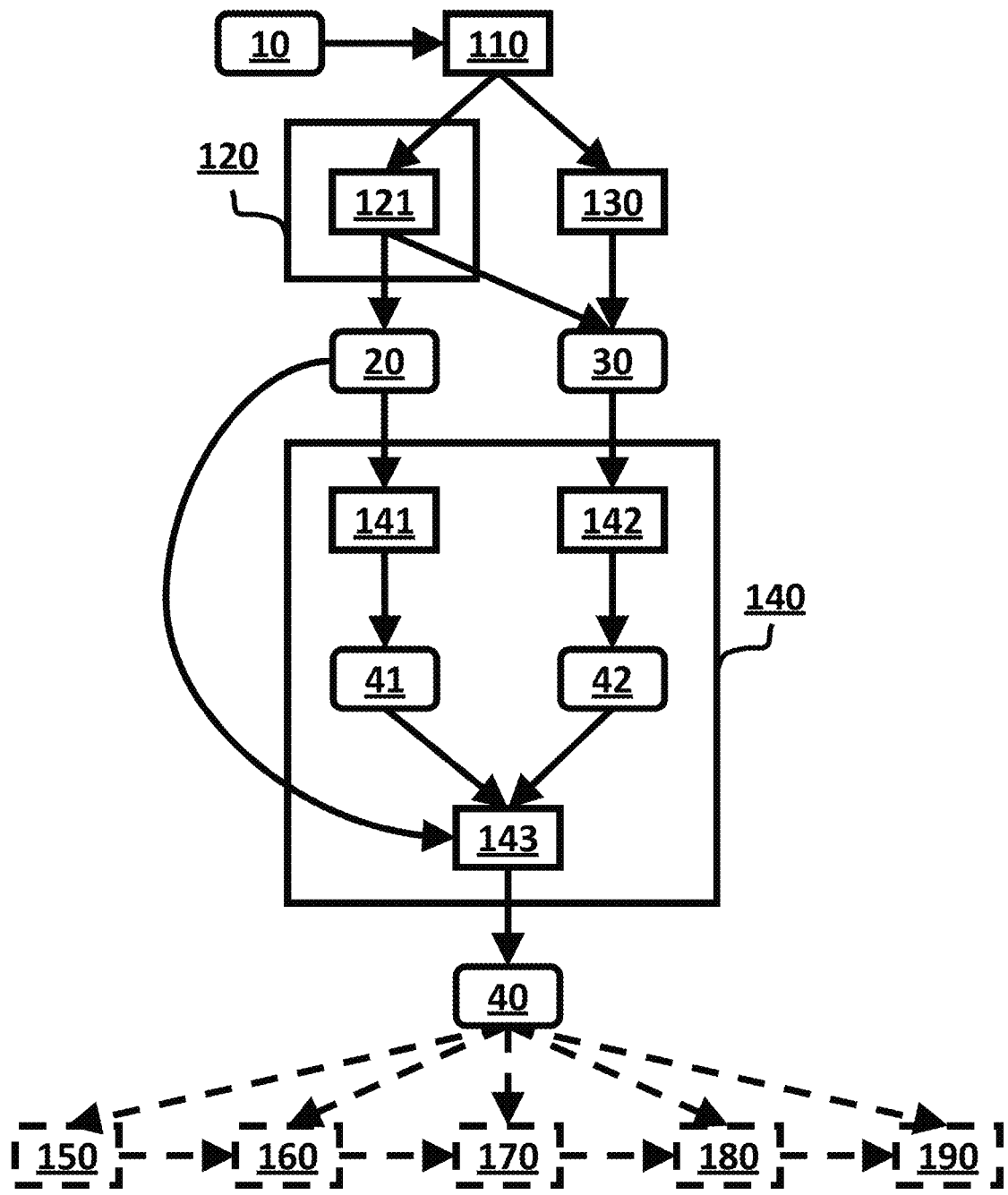

As an example, as in FIG. 3, the text summarization algorithm may comprise applying 141 the one or more portions of the text 20 to an importance classifier configured to classify each portion of the text 20 in terms of at least two classes indicating different levels of importance. In one embodiment, the classifier may take data from a plurality of sources, wherein data from the plurality of sources may have different weights. In one example embodiment, if the classifier is not confident in terms of the content of the text, the classifier may put more emphasis on the handwriting features. As an example, the at least two classes may be labelled "important" and "not important". In examples, in case of three classes, the classes may be labelled "very important", "important", and "not important". Importance may indicate that a portion shall be included or contribute to the text summary 40. The importance classifier may be a natural language processing machine-learning algorithm pre-trained for extraction-based text summarization. In examples, instead of the importance classifier a regression algorithm can be used to output an importance value (e.g. a real number in the interval [0, 1]) that, if needed, can be classified upon discretization of the importance value.

As in FIG. 3, the text summarization algorithm may comprise applying 142 the one or more dynamic features 30 for each portion of the text 20 to at least one quality classifier configured to classify the one or more dynamic features 30 for each portion of the text 20 in terms of at least two classes relating to information about the user.

In examples, qualities can be properties of the written language which indicate certain meanings, styles or tones to a user. For example, a quality may include how expert a writer seems, how authoritative they are, how child-like or old they are, their emotional state, or other. Qualities may be indicated in any aspect of writing or handwriting, including the graphical form of the handwriting, the properties of the dynamic motions used to create the handwriting, the word choice, language construction, or other. Some qualities may be easily identified by humans, and some qualities may only be easily recognized algorithmically. This is largely dependent on which aspects of the writing the quality indicate. As an example, simplistic word use can be easily recognized by a human as being "child-like", but subtle changes in applied pressure may only indicate domain expertise level to an algorithm.

The at least one quality classifier may correspond to one or more of the emotional state, the age, a level of confidence, and the level of competence of the user. As an example, the at least one quality classifier may correspond to the emotional state of the user. Alternatively, or in addition, the at least one quality classifier or another quality classifier may correspond to the age of the user. Alternatively, or in addition, the at least one quality classifier or another quality classifier may correspond to the level of confidence of the user. Alternatively, or in addition, the at least one quality classifier or another quality classifier may correspond to the level of competence of the user. Alternatively, or in addition, the at least one quality classifier may output a vector (e.g. a two-dimensional vector, a three-dimensional vector, or a four-dimensional vector) for any two or three combinations of the emotional state, the age, the level of confidence, and the level of competence of the user, or for the combination of the emotional state, the age, the level of confidence, and the level of competence of the user.

In an embodiment, the at least one quality classifier may correspond to the level of competence of the user. As an example, classifying the level of competence of the user may be in terms of two or three classes (e.g. "expert" and "novice" or e.g. "expert", "normal", and "novice"). As an example, the level of competence can be decisive when it comes to deciding which portions of the text 20 is relevant for the text summary 40. In examples, the level of competence may be decisive when collating (180) text summaries of several users and deciding that a portion of a user shall contribute to the (collated) text summary 40. The one or more quality classifiers may be a machine-learning algorithm in a pre-trained state (i.e. after training on training data). As an example, the one or more quality classifiers may be trained on results of specific user-groups relevant to the use case, e.g. children, students or learners. For example, the quality classifier corresponding to the level of competence may have been trained on examples of "expert", "normal" and "novice". In this context, the class "expert" may refer to handwriting input 10 (and the one or more dynamic features extracted therefrom) produced by children or students known to be very competent in that area. The class "normal" may refer to handwriting input 10 (and the one or more dynamic features extracted therefrom) produced by children or students with only limited exposure to that area. The class "novice" may refer to handwriting input 10 (and the one or more dynamic features extracted therefrom) produced by children or students working on a totally new area.

In an embodiment, as illustrated in FIG. 3, the text summarization algorithm may comprise applying 143 a portion ranking algorithm configured to assign a ranking value to each portion of the text 20 based on the corresponding classification results 41 of the importance classifier and on the corresponding classification results 42 of the at least one quality classifier. Assigning a ranking value SR of each portion of the text 20 based on the corresponding classification results 41 of the importance classifier and on the corresponding classification results 42 of the at least one quality classifier may comprise computing a linear combination $$SR = aIC + (b_1 Q_1 C_1 + \ldots + b_N Q C_N)/N$$

of a numeric result IC of the importance classifier and a normalized linear combination of numeric results $QC_1$, $QC_2, \ldots, QC_N$ of the N quality classifiers.

The numeric results of the importance classifier and of the N quality classifiers can be pre-determined values corresponding to the respective classes of the importance classifier or the N quality classifiers, respectively. As an example, the pre-determined values can be user-defined, i.e. they can be adjusted in a settings menu of the user interface 210 of the system 200. Some of them can be chosen to be zero (e.g. to discard normal level of competence). As an example, the numeric result of the class "expert" can be one and the numeric results of the classes "normal" or "novice" can be zero. In examples, the numeric results of the classes "expert" or "novice" can be one and the numeric result of the class "normal" can be zero. In examples, in case of replacing classifiers by regressors the numeric results can be the output values of the regressors.

Coefficients, e.g. a, of the linear combination and/or coefficients $b_1, \ldots, b_N$ of the normalized linear combination can be pre-determined weights. Again, the pre-determined weights can also be user-defined, i.e. they can be adjustable in the settings menu of the user interface 210. They can also be set to zero (e.g. to eliminate or suppress vague statements from non-experts).

The (one or more) portions of the text 20 with corresponding ranking values above a predetermined threshold value can be concatenated (e.g. in the order the one or more portions appear in the text 20), thereby generating 140 the text summary 40. The predetermined threshold value may also be user-defined, i.e. it can be adjusted in the settings menu of the user interface 210. A lower threshold may result in a less compressed summarization. The right order of the one or more portions (e.g. when queried from the database) can be restored from the enumeration or the timestamps.

In an embodiment, the method 100 may further comprise applying 150 the text summary 40 to a style transfer algorithm configured to modify the text summary 40 so as to reflect the information about the user. The style transfer algorithm may apply at least one style transfer network. In one embodiment, different areas of the text may have different fonts, e.g., italics, bold, underlined, etc., to notify the users on the importance of each specific area of their notes.

Figure 5A:
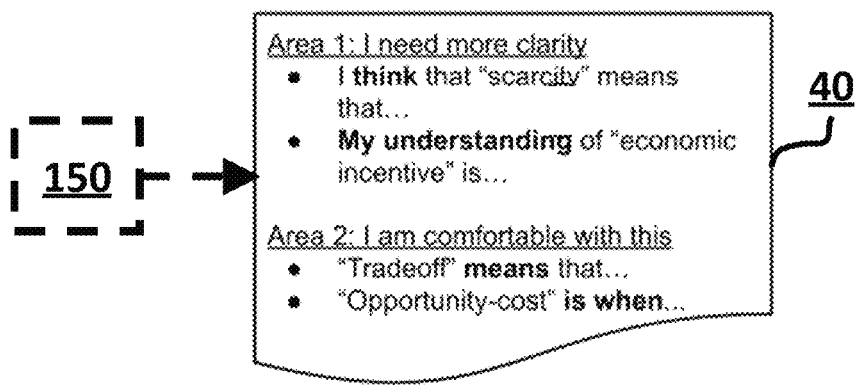
FIG. 5a illustrates an example for handwriting-to-text-summarization with style transfer.

Modifying the text summary 40 may comprise selecting for each portion of the text summary 40 one or more style transfer networks (also selecting their order) based on the one or more classification results 42 of the one or more quality classifiers (e.g. queried from the database), and modifying each portion of the text summary 40 by applying the corresponding one or more transfer networks, thereby modifying the text summary 40. The selection of the one or more style transfer networks may be influenced by user settings. As an example, style transfer network associated to the level of competence may apply the linguistic style of an expert to the input text, such that the output appears to have been written by an expert (e.g. confident word choice, no hedge words). The neural network itself may have been trained on examples of expert writings in different domains (levels of competence), such that the "expert" language is not necessarily domain specific. An example of a text summary 40 after style transformation is shown in FIG. 5*a*.

In examples, the at least one style transfer network may be an auto-encoder neural network in a pre-trained state (i.e. after training on training data).

Figure 5B:
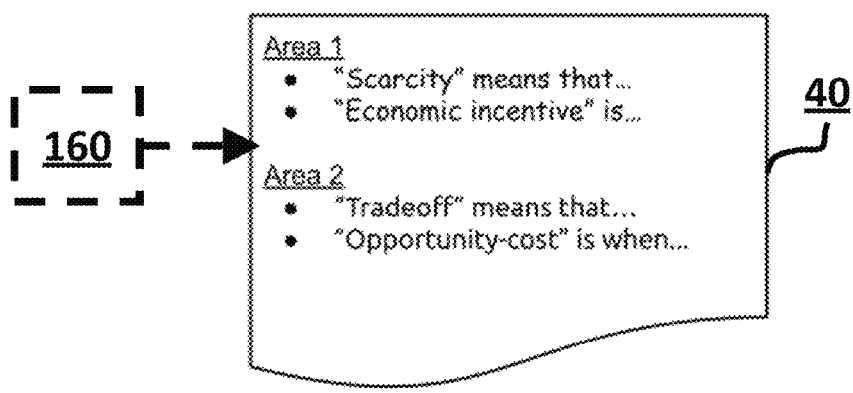
FIG. 5b illustrates an example for handwriting-to-text-summarization with font modification.

In an embodiment, the method 100 may further comprise applying 160 the text summary 40 to a font modification algorithm configured to change the font of at least one portion of the text summary 40 based on the information about the user. In one example embodiment, the font modification algorithm may change the font of at least one portion of the text based, at least in part, on emotional state, age, level of confidence, a level of competence, or a combination thereof of the user. Changing the font of the at least one portion of the text summary 40 based on the information about the user may comprise querying for each portion of the text summary 40 a font based on the one or more classification results 42 of the one or more quality classifiers matching the font labels of the font, and formatting each portion in the corresponding font, thereby modifying the text summary 40. At least one font may be queried from a font database or from the database. Changing the font depending e.g. on the level of competence of the user of the system 200 can be seen as a feedback means to inform the user of portions of the text 20 that are deemed to be less certain. It may also be conducive to enhancing the perceptibility of the text summary 40 to the user (also when reviewing the text summary 40 at a later time). In so doing, such feedback may contribute to a better understanding of the text 20. An example of a text summary 40 after font modification is shown in FIG. 5*b*.

In an embodiment, the method 100 may further comprise applying 170 the text summary 40 to an annotation algorithm configured to add at least one annotation to the text summary 40 based on the information about the user. Adding the at least one annotation to the text summary 40 based on the information about the user may comprise querying, for each portion of the text summary 40, an annotation database so as to find a matching annotation to the portion (or parts thereof such as e.g. a selection of one or more words of the portion) and to the one or more classification results 42 of the one or more quality classifiers, and evaluating a predetermined trigger condition, and adding the matching annotation to the portion, if a matching annotation has been found and the predetermined trigger condition is satisfied, or adding a universal annotation to the portion, if a matching annotation has not been found and the predetermined trigger condition is satisfied, thereby modifying the text summary 40.

Each annotation may have a specific level of competence trigger, i.e. "expert", "normal", "novice" which can be used in the assignment of one or more annotations to a specific portion of the text 20. A matching annotation, such as e.g. "Dolphins are mammals and therefore need to breathe air", may be pre-defined by a teacher, parent, or other. These may have specific pre-defined trigger words or combinations of words, such as "dolphin", "mammal", "breathing".

Figure 5C:
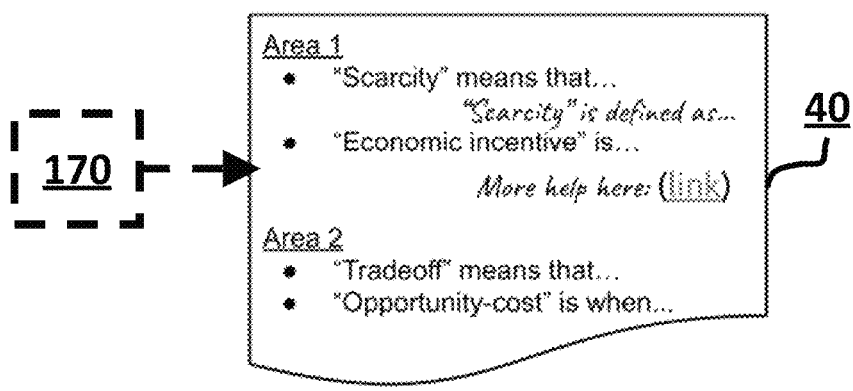
FIG. 5c illustrates an example for handwriting-to-text-summarization with annotation.

The matching annotation or the universal annotation may result from a queried annotation template after parametrization based on the portion and/or the one or more classification results 42 of the one or more quality classifiers. As an example, the universal annotation can be an interactive hyperlink (e.g. via the user interface 210 of the system 200) to a search engine. In fact, a parametrization can consist in adding the interactive hyperlink to a phrase such as e.g. "more help here: (hyperlink)". An example of a text summary 40 with annotation(s) is shown in FIG. 5c.

In an embodiment, the method 100 may further comprise applying 180 the text summary 40 to a collation algorithm configured to compare the text summary 40 to one or more further text summaries corresponding to one or more further users of one or more further systems 200 for handwriting-to-text-summarization (e.g. a network of systems 200 for handwriting-to-text-summarization), and to sample a collated text summary 40 based on the information about the user and on information about the one or more further users, thereby modifying the text summary 40. In one embodiment, the data from the plurality of users taking notes at the same time are implemented to train the collation algorithm. The collation algorithm may then train the system to evaluate the notes of the plurality of users to provide feedback. For example initially, the system could provide feedback in a general way, but as more and more people from the same classroom are actually taking notes (e.g., a plurality of students are taking notes for a particular subject), the system may process all these notes to generate an average value to provide feedback to the students of similar classes. Collating text summaries 40 (the text summary and the further text summaries) can be used when note taking is for the same event (e.g. a business meeting, a lecture). Comparing the text summary 40 to one or more further text summaries may comprise identifying for each portion (or for each of a subset of portions) of the text summary 40 a list of corresponding further portions in the one or more further text summaries. Alternatively, or in addition, text summaries 40 can be compared at the word and/or phrase-level.

Figure 5D:
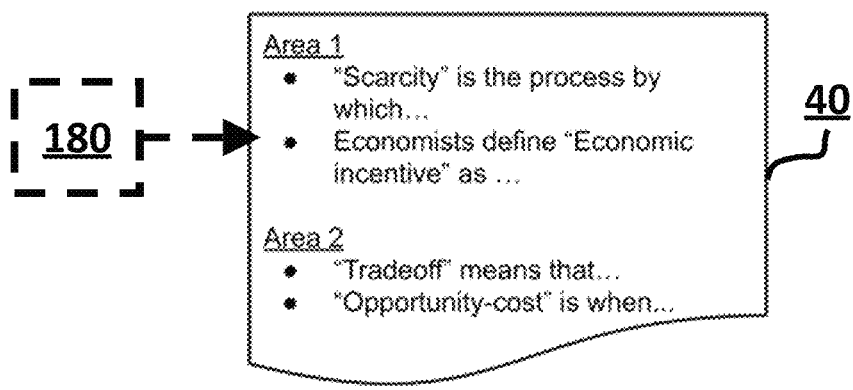
FIG. 5d illustrates an example for handwriting-to-text-summarization after collation.

Sampling a collated text summary 40 based on the information about the user and on the information about the one or more further users may comprise selecting a portion or a further portion for each list based on the information about the user and on the information about the one or more further users. The information about the user and the information about the one or more further users may correspond to the level of competence of the user or the further users, respectively. Level of competence can be decisive when deciding which portion shall be included in the collated text summary. As an example, in case where multiple valid or equivalent portions have an "expert" classification, one of them may be chosen at random. In examples, in case of a portion having no equivalents in the further text summaries, the portion may be immediately selected by default. In some cases, for example, if a teacher wants to understand where students are commonly missing knowledge, one or more portions with an "novice" classification may be selected instead. An example of a text summary 40 after collation is shown in FIG. 5d.

The method 100 may further comprise displaying 190 the text summary 40 via a graphical output 230 of the user interface 210 of the system 200 for handwriting-to-text-summarization. User settings can be set via the user interface 210 of the system 200.

Figure 2:
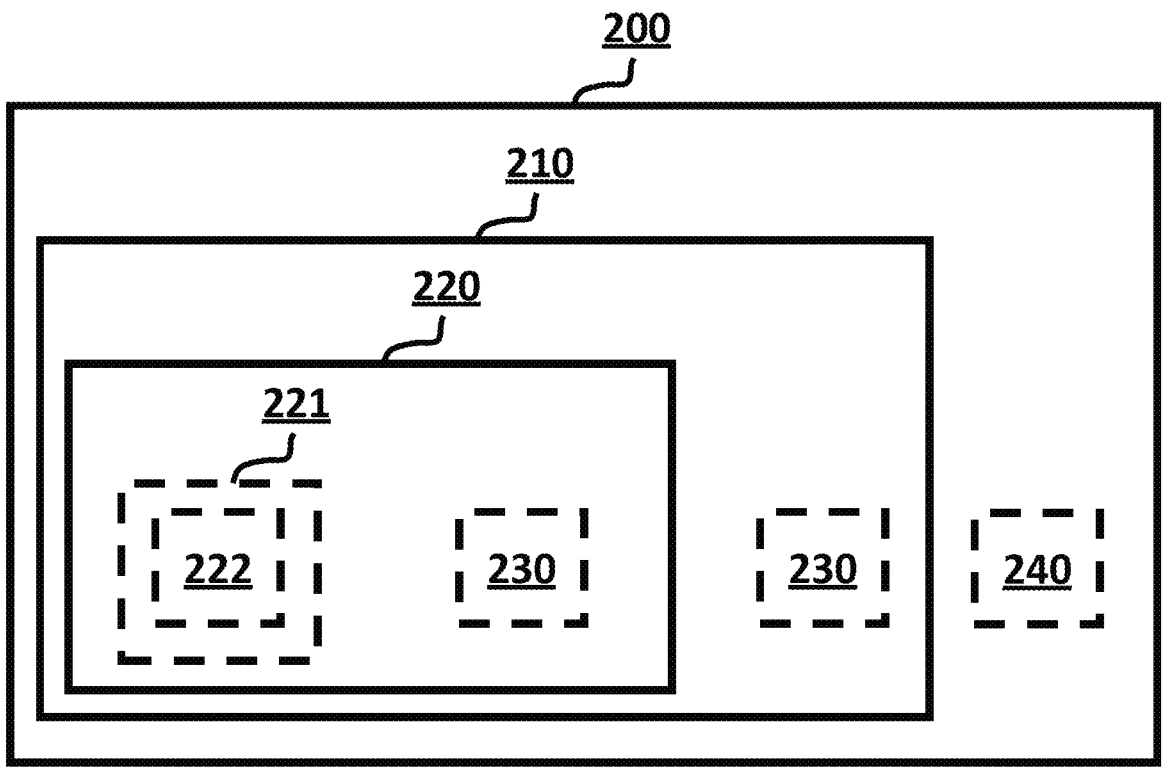

The system 200 for handwriting-to-text-summarization, may comprise a user interface 210 comprising a capturing subsystem 220 configured to capture a handwriting of a user of the system 200, and wherein the system 200 is configured to run the method 100 of one of the preceding claims. Such a system is schematically illustrated in FIG. 2.

The capturing subsystem 220 may comprise a touchpad, a touch screen, a graphics tablet, or a digital tablet. Capturing the handwriting of the user of the system 200 may comprise capturing handwriting input 10 representing text 20 written by hand or writing utensil 221 by the user on the touchpad, the touch screen, the graphics tablet, or the digital tablet. As an example, a touch screen or digital tablet may be capable of capturing stroke vectors, which may contain information such as stroke pressure, stroke duration and/or stroke distance.

The capturing subsystem 220 may comprise or be integrated in a writing utensil 221. The writing utensil 221 is a ballpoint pen, a fountain pen, a felt-tip pen, a brush, a pencil. Alternatively, or in addition, the writing utensil 221 can be a digital pen or a smart pen. As in FIG. 4, the writing utensil 221 may comprise a motion sensor module 222 comprising one or more of one or more accelerometers, one or more gyroscopes, one or more magnetometers, and one or more force or pressure sensors. The motion sensor module 222 may be configured to capture handwriting motion data comprising one or more of pressure, speed, acceleration, and direction of the writing utensil 221 when being used by the user to write text 20 by hand. Capturing the handwriting of the user of the system 200 comprises capturing handwriting input 10 comprising handwriting motion data of the writing utensil 221 when being used by the user to write text 20 by hand.

The user interface 210 may comprise a graphical output 230. The graphical output 230 (e.g. a touch screen) may allow for user interaction.

The system 200 may comprise at least one database. Alternatively, or in addition, the system 200 may access a database in a cloud (via a communication interface). The system 200 may comprise a (at least one) communication interface 240 to couple to one or more systems 200 for handwriting-to-text-summarization. The communication interface 240 may comprise one or more of a network, internet, a local area network, a wireless local area network, a broadband cellular network, and/or a wired network. In examples, the system may couple to one or more systems 200 via a server hosted in a cloud. As an example, such network connectivity can be used when collating the text summary 40 to the further text summaries.

Figure 6:
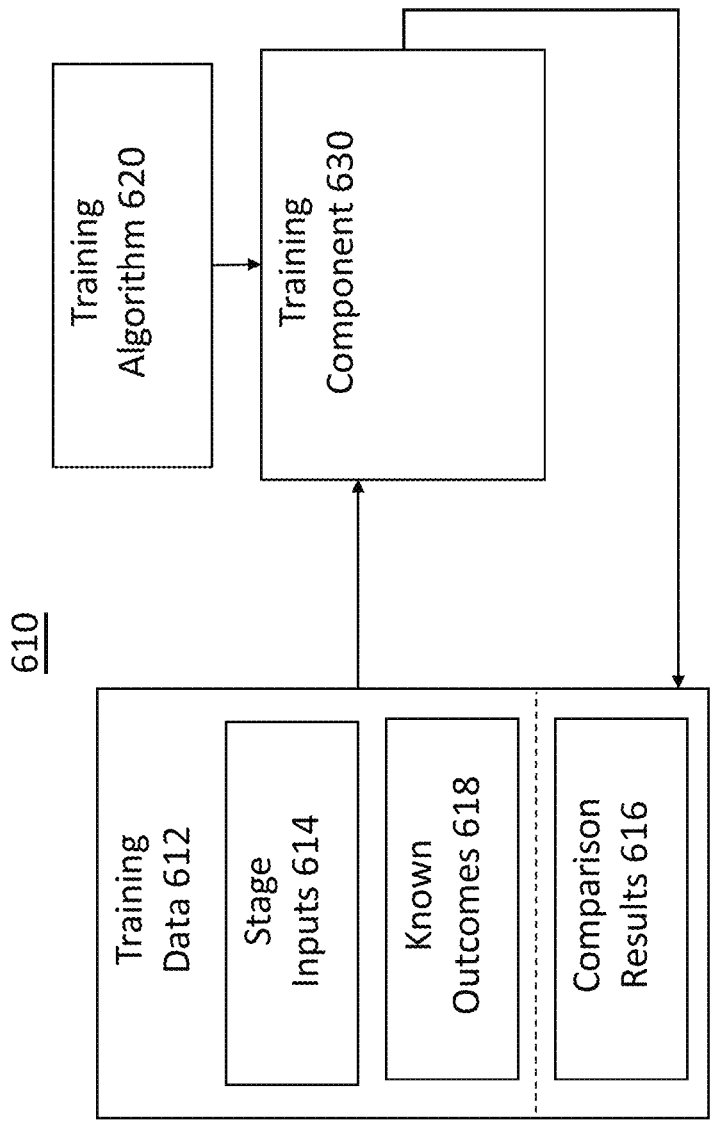
FIG. 6 shows an example machine learning training flow chart.

One or more implementations disclosed herein include and/or may be implemented using a machine learning model. For example, one or more of the text pre-processing algorithm, machine-learning algorithm, handwriting dynamics algorithm, text summarization algorithm, regression algorithm, portion ranking algorithm, style transfer algorithm, font modification algorithm, annotation algorithm, and/or collation algorithm may be implemented using a machine learning model and/or may be used to train a machine learning model. A given machine learning model may be trained using the data flow 610 of FIG. 6. Training data 612 may include one or more of stage inputs 614 and known outcomes 618 related to a machine learning model to be trained. The stage inputs 614 may be from any applicable source including text, visual representations, data, values, comparisons, stage outputs (e.g., one or more outputs from a step from FIGS. 1, 2, and/or 3). The known outcomes 618 may be included for machine learning models generated based on supervised or semi-supervised training. An unsupervised machine learning model may not be trained using known outcomes 618. Known outcomes 618 may include known or desired outputs for future inputs similar to or in the same category as stage inputs 614 that do not have corresponding known outputs.

The training data 612 and a training algorithm 620 (e.g., one or more of the text pre-processing algorithm, machine-learning algorithm, handwriting dynamics algorithm, text summarization algorithm, regression algorithm, portion ranking algorithm, style transfer algorithm, font modification algorithm, annotation algorithm, and/or collation algorithm implemented using a machine learning model and/or may be used to train a machine learning model) may be provided to a training component 630 that may apply the training data 612 to the training algorithm 620 to generate a machine learning model. According to an implementation, the training component 630 may be provided comparison results 616 that compare a previous output of the corresponding machine learning model to apply the previous result to re-train the machine learning model. The comparison results 616 may be used by the training component 630 to update the corresponding machine learning model. The training algorithm 620 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 1, 2, and/or 3 may be performed by one or more processors of a computer system as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

Figure 7:
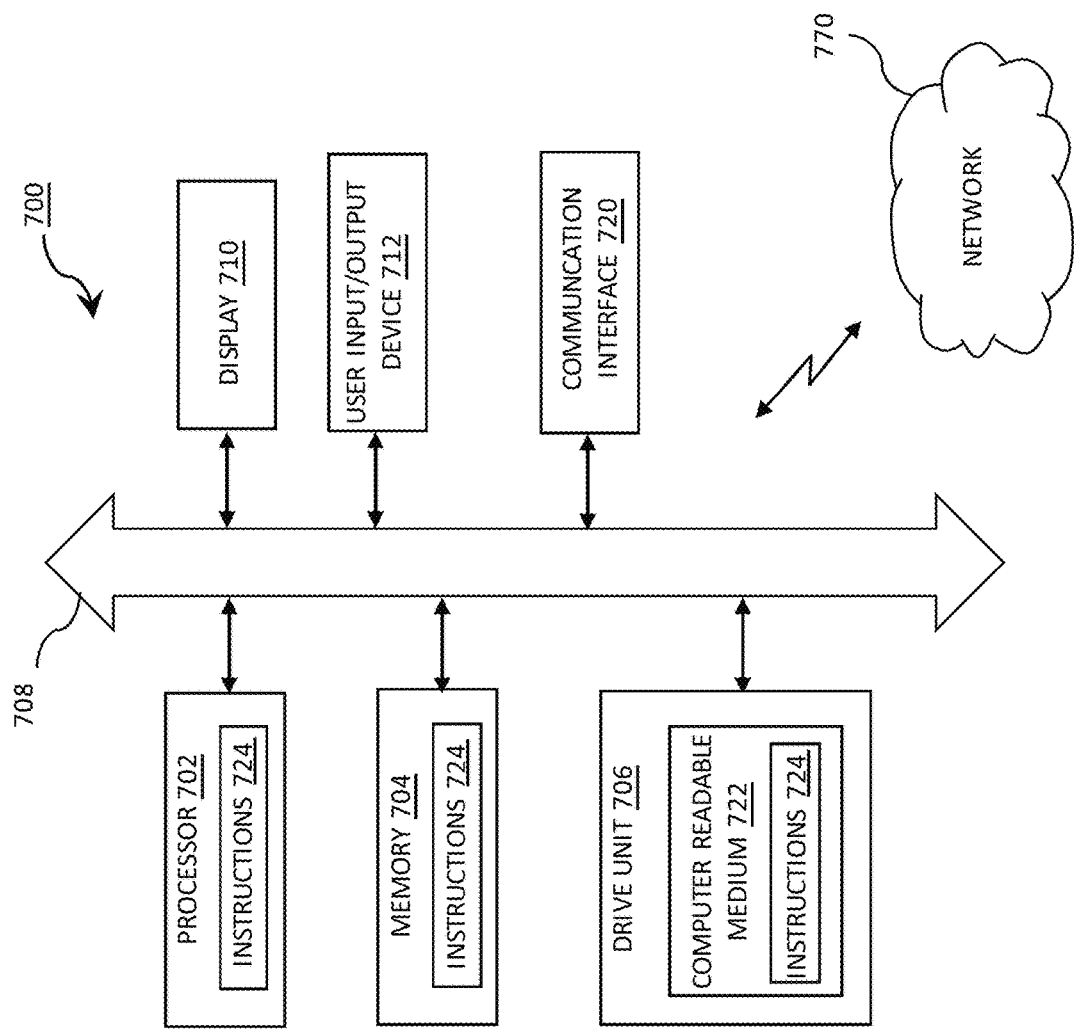
FIG. 7 illustrates an implementation of a general computer system that may execute techniques presented herein.

In various embodiments, one or more portions of method 100 and system 200 may be implemented in, for instance, a chip set including a processor and a memory as shown in FIG. 7. FIG. 7 illustrates an implementation of a general computer system that may execute techniques presented herein. The computer system 700 can include a set of instructions that can be executed to cause the computer system 700 to perform any one or more of the methods, system, or computer based functions disclosed herein. The computer system 700 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "determining", or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video, or data communication. Further, while a computer system 700 is illustrated as a single system, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 700 may further include a display 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input/output device 712 configured to allow a user to interact with any of the components of computer system 700. The input/output device 712 may be a number pad, a keyboard, or a cursor control device, such as a mouse, or a joystick, touch screen display, remote control, or any other device operative to interact with the computer system 700.

The computer system 700 may also or alternatively include drive unit 706 implemented as a disk or optical drive. The drive unit 706 may include a computer-readable medium 722 in which one or more sets of instructions 724, e.g. software, can be embedded. Further, instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 770 can communicate voice, video, audio, images, or any other data over the network 770. Further, the instructions 724 may be transmitted or received over the network 770 via a communication port or interface 720, and/or using a bus 708. The communication port or interface 720 may be a part of the processor 702 or may be a separate component. The communication port or interface 720 may be created in software or may be a physical connection in hardware. The communication port or interface 720 may be configured to connect with a network 770, external media, the display 710, or any other components in computer system 700, or combinations thereof. The connection with the network 770 may be a physical connection, such as a wired Ethernet connection or may be established wirelessly as discussed below. Likewise, the additional connections with other components of the computer system 700 may be physical connections or may be established wirelessly. The network 770 may alternatively be directly connected to a bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to a network 770. The network 770 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 770 may include wide area networks (WAN), such as the Internet, local area networks (LAN), campus area networks, metropolitan area networks, a direct connection such as through a Universal Serial Bus (USB) port, or any other networks that may allow for data communication. The network 770 may be configured to couple one computing device to another computing device to enable communication of data between the devices. The network 770 may generally be enabled to employ any form of machine-readable media for communicating information from one device to another. The network 770 may include communication methods by which information may travel between computing devices. The network 770 may be divided into sub-networks. The sub-networks may allow access to all of the other components connected thereto or the sub-networks may restrict access between the components. The network 770 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present invention has been described above and is defined in the attached claims, it should be understood that the invention may alternatively be defined in accordance with the following embodiments:

1. A computer-implemented method (100) for handwriting-to-text-summarization, comprising:
   obtaining (110), via a user interface (210) of a system (200), a handwriting input (10) representing a handwriting of a user of the system (200) for handwriting-to-text-summarization;
   recognizing (120) a text (20) in the handwriting input (10);
   extracting (130) at least one dynamic feature (30) of the handwriting from the handwriting input (10);
   generating (140) a text summary (40) of the text (20);
   wherein generating (140) the text summary (40) is based on the text (20) and on the at least one dynamic feature (30) of the handwriting.
2. The method (100) of embodiment 1, wherein the one or more dynamic features (30) comprise an average writing pressure, an average stroke length, and/or an average stroke duration, wherein averaging is over the text (20) or portions thereof.
3. The method (100) of embodiment 1 or 2, wherein the text (20) is semantically and/or linguistically interpretable with respect to at least one communication language.
4. The method (100) of one of the preceding embodiments, wherein the handwriting input (10) comprises a first set of data representing the text.
5. The method (100) of one of the preceding embodiments, wherein the handwriting input (10) comprises a second set of data representing properties of the handwriting that indicate information about the user as handwriting progresses.
6. The method (100) of embodiment 5, wherein the information about the user relates to an emotional state, an age, and/or a level of competence of the user.
7. The method (100) of embodiment 5 or 6, when dependent on embodiment 4, wherein the first set of data and the second set of data overlap or are identical.
8. The method (100) of one of the preceding embodiments, wherein recognizing (120) the text (20) in the handwriting input (10) comprises applying the handwriting input (10) to a text pre-processing algorithm configured to recognize the text (20) represented by the handwriting input (10).
9. The method (100) of embodiment 8, wherein the text pre-processing algorithm is further configured to segment (121) the text (20) into one or more portions.
10. The method (100) of embodiment 9, wherein the one or more portions are sentences, clauses, and/or phrases.
11. The method (100) of embodiment 9 or 10, wherein the one or more portions are enumerated as they appear in the text.
12. The method (100) of one of the embodiments 8 to 11, wherein the text pre-processing algorithm comprises or is a machine-learning algorithm pre-trained for handwriting-to-text recognition and/or text segmentation.
13. The method (100) of one of the embodiments 8 to 12, when dependent on embodiment 4, wherein the text pre-processing algorithm is configured to segment the first set of data into individual character vectors and apply a pre-determined vector-to-character mapping to output the text.
14. The method (100) of one of the preceding embodiments, wherein the text pre-processing algorithm is further configured to store the text (20) in a database.
15. The method (100) of one of the preceding embodiments, when dependent on embodiment 9, wherein the text pre-processing algorithm is further configured to store the one or more portions of text (20) in a database.
16. The method (100) of one of the preceding embodiments, wherein extracting (130) the at least one dynamic feature (30) of the handwriting from the handwriting input (10) comprises applying the handwriting input (10) to a handwriting dynamics algorithm configured to extract the at least one dynamic feature (30) from the handwriting input (10).
17. The method (100) of embodiment 16, wherein the handwriting dynamics algorithm is further configured to compute at least one dynamic feature (30) for each portion of the text.
18. The method (100) of embodiment 16 or 17, when dependent on embodiment 2, wherein the handwriting dynamics algorithm is further configured to compute the average writing pressure, the average stroke length, and/or the average stroke duration, wherein averaging is over the text (20) or portions thereof, thereby producing the one or more dynamic features (30) for the text (20) or for each portion thereof.
19. The method (100) of embodiment 18, when dependent on embodiment 5, wherein computing the average writing pressure, the average stroke length, and/or the average stroke duration is based on the second set of data.
20. The method (100) of one of the preceding embodiments, when dependent on embodiment 14, wherein the handwriting dynamics algorithm is further configured to store the one or more dynamic features (30) for the text (20) in the database.
21. The method (100) of one of the preceding embodiments, when dependent on embodiment 15, wherein the handwriting dynamics algorithm is further configured to store the one or more dynamic features (30) for each portion of the text (20) in the database.
22. The method (100) of one of the preceding embodiments, wherein generating (140) the text summary (40) of the text (20) based on the text (20) and on the at least one dynamic feature (30) of the handwriting comprises applying the text (20) and the one or more dynamic features (30) to a text summarization algorithm configured to generate the text summary (40) of the text (20).

23. The method (100) of embodiment 22, wherein the text summarization algorithm comprises or is a natural language processing machine-learning algorithm pre-trained for extraction-based or abstraction-based text summarization.

24. The method (100) of embodiment 22 or 23, when dependent on embodiment 9, wherein the text summarization algorithm comprises applying (141) the one or more portions of the text (20) to an importance classifier configured to classify each portion of the text (20) in terms of at least two classes indicating different levels of importance.

25. The method (100) of embodiment 24, wherein the importance classifier is a natural language processing machine-learning algorithm pre-trained for extraction-based text summarization.

26. The method (100) of embodiment 24 or 25, wherein the text summarization algorithm comprises applying (142) the one or more dynamic features (30) for each portion of the text (20) to at least one quality classifier configured to classify the one or more dynamic features (30) for each portion of the text (20) in terms of at least two classes relating to information about the user.

27. The method (100) of embodiment 26, when dependent on embodiment 6, wherein the at least one quality classifier corresponds to one or more of the emotional state, the age, and the level of competence of the user.

28. The method (100) of embodiment 26 or 27, wherein the at least one quality classifier corresponds to the level of competence of the user.

29. The method (100) of embodiment 28, wherein classifying the level of competence of the user is in terms of two or three classes.

30. The method (100) of one of the embodiments 26 to 29, wherein the one or more quality classifiers are machine-learning algorithm in a pre-trained state.

31. The method (100) of one of the preceding embodiments, when dependent on embodiment 26, wherein the text summarization algorithm comprises applying (143) a portion ranking algorithm configured to assign a ranking value to each portion of the text (20) based on the corresponding classification results (41) of the importance classifier and on the corresponding classification results (42) of the at least one quality classifier.

32. The method (100) of embodiment 31, wherein assigning a ranking value to each portion of the text (20) based on the corresponding classification results (41) of the importance classifier and on the corresponding classification results (42) of the at least one quality classifier comprises computing a linear combination of a numeric result (IC) of the importance classifier and a normalized linear combination of numeric results ($QC_1$, $QC_2$, ..., $QC_N$) of the N quality classifiers;
wherein the numeric results of the importance classifier and of the N quality classifiers are pre-determined values corresponding to the respective classes of the importance classifier or the N quality classifiers, respectively; and
wherein coefficients of the linear combination and/or coefficients of the normalized linear combination are pre-determined weights.

33. The method (100) of embodiment 31 or 32, wherein the portions of the text (20) with corresponding ranking values above a predetermined threshold value are concatenated, thereby generating (140) the text summary (40).

34. The method (100) of one of the preceding embodiments, when dependent on embodiment 5, further comprising applying (150) the text summary (40) to a style transfer algorithm configured to modify the text summary (40) so as to reflect the information about the user.

35. The method (100) of embodiment 34, wherein the style transfer algorithm applies at least one style transfer network.

36. The method (100) of embodiment 34 or 35, when dependent on embodiments 9 and 26, wherein modifying the text summary (40) comprises:
selecting for each portion of the text summary (40) one or more style transfer networks based on the one or more classification results (42) of the one or more quality classifiers; and
modifying each portion of the text summary (40) by applying the corresponding one or more transfer networks;
thereby modifying the text summary (40).

37. The method (100) of embodiment 35 or 36, wherein the at least one style transfer network is an auto-encoder neural network in a pre-trained state.

38. The method (100) of one of the preceding embodiments, when dependent on embodiments 5 and 9, further comprising applying (160) the text summary (40) to a font modification algorithm configured to change the font of at least one portion of the text summary (40) based on the information about the user.

39. The method (100) of embodiment 38, wherein changing the font of the at least one portion of the text summary (40) based on the information about the user comprises:
querying for each portion of the text summary (40) a font based on the one or more classification results (42) of the one or more quality classifiers matching the font labels of the font;
formatting each portion in the corresponding font;
thereby modifying the text summary (40).

40. The method (100) of embodiment 38 or 39, wherein at least one font is queried from a font database.

41. The method (100) of one of the preceding embodiments, when dependent on embodiment 5, further comprising applying (170) the text summary (40) to an annotation algorithm configured to add at least one annotation to the text summary (40) based on the information about the user.

42. The method (100) of embodiment 41, when dependent on embodiments 9 and 26, wherein adding the at least one annotation to the text summary (40) based on the information about the user comprises:
querying, for each portion of the text summary (40), an annotation database so as to find a matching annotation to the portion and to the one or more classification results (42) of the one or more quality classifiers; and
evaluating a predetermined trigger condition; and
adding the matching annotation to the portion, if a matching annotation has been found and the predetermined trigger condition is satisfied; or
adding a universal annotation to the portion, if a matching annotation has not been found and the predetermined trigger condition is satisfied;
thereby modifying the text summary (40).

43. The method (100) of embodiment 42, wherein the matching annotation or the universal annotation results from a queried annotation template after parametrization based on the portion and/or the one or more classification results (42) of the one or more quality classifiers.

44. The method (100) of embodiment 43, wherein the universal annotation is an interactive hyperlink to a search engine.

45. The method (100) of one of the preceding embodiments, when dependent on embodiment 5, further comprising applying (180) the text summary (40) to a collation algorithm configured:
   to compare the text summary (40) to one or more further text summaries corresponding to one or more further users of one or more further systems (200) for handwriting-to-text-summarization; and
   to sample a collated text summary (40) based on the information about the user and on information about the one or more further users;
thereby modifying the text summary (40).

46. The method (100) of embodiment 45, when dependent on embodiment 9, wherein comparing the text summary (40) to one or more further text summaries comprises identifying for each portion of the text summary (40) a list of corresponding further portions in the one or more further text summaries.

47. The method (100) of embodiment 46, wherein sampling a collated text summary (40) based on the information about the user and on the information about the one or more further users comprises selecting a portion or a further portion for each list based on the information about the user and on the information about the one or more further users.

48. The method (100) of embodiment 47, wherein the information about the user and the information about the one or more further users correspond to the level of competence of the user or the further users, respectively.

49. The method (100) of one of the preceding embodiments, wherein user settings can be set via the user interface (210) of the system (200).

50. The method (100) of one of the preceding embodiments, further comprising displaying (190) the text summary (40) via a graphical output (230) of the user interface (210) of the system (200) for handwriting-to-text-summarization.

51. A system (200) for handwriting-to-text-summarization, comprising a user interface (210) comprising a capturing subsystem (220) configured to capture a handwriting of a user of the system (200), and wherein the system (200) is configured to run the method (100) of one of the preceding embodiments.

52. The system (200) of embodiment 51, wherein the capturing subsystem (220) comprises a touchpad, a touch screen, a graphics tablet, or a digital tablet.

53. The system (200) of embodiment 52, wherein capturing the handwriting of the user of the system (200) comprises capturing handwriting input (10) representing text (20) written by hand or writing utensil (221) by the user on the touchpad, the touch screen, the graphics tablet, or the digital tablet.

54. The system (200) of one of the embodiments 51 to 53, wherein the capturing subsystem (220) comprises or is integrated in a writing utensil (221).

55. The system (200) of embodiment 54, wherein the writing utensil (221) is a ballpoint pen, a fountain pen, a felt-tip pen, a brush, a pencil.

56. The system (200) of embodiment 54, wherein the writing utensil (221) is a digital pen or a smart pen.

57. The system (200) of embodiment 55 or 56, wherein the writing utensil (221) comprises a motion sensor module (222) comprising one or more of one or more accelerometers, one or more gyroscopes, one or more magnetometers, and one or more force or pressure sensors.

58. The system (200) of embodiment 57, wherein the motion sensor module (222) is configured to capture handwriting motion data comprising one or more of pressure, speed, acceleration, and direction of the writing utensil (221) when being used by the user to write text (20) by hand.

59. The system (200) of embodiment 57 or 58, wherein capturing the handwriting of the user of the system (200) comprises capturing handwriting input (10) comprising handwriting motion data of the writing utensil (221) when being used by the user to write text (20) by hand.

60. The system (200) of one of the embodiments 51 to 59, wherein the handwriting input (10) comprises a first set of data representing the text.

61. The system (200) of one of the embodiments 51 to 60, wherein the handwriting input (10) comprises a second set of data representing properties of the handwriting that indicate information about the user as handwriting progresses.

62. The system (200) of embodiment 60 or 61, wherein the first set of data and the second set of data overlap or are identical.

63. The system (200) of one of the embodiments 51 to 62, wherein the user interface (210) comprises a graphical output (230).

64. The system (200) of embodiment 63, wherein the graphical output (230) allows for user interaction.

65. The system (200) of one of the embodiments 51 to 64, comprising at least one database.

66. The system (200) of one of the embodiments 51 to 65, comprising a communication interface (240) to couple to one or more systems (200) for handwriting-to-text-summarization.

REFERENCE NUMERALS

10 handwriting input
20 text (in the handwriting input)
30 at least one dynamic feature
40 text summary (of the text)
41 classification result of the importance classifier
42 classification result(s) of the at least one quality classifier
100 computer-implemented method for handwriting-to-text-summarization
110 obtaining a handwriting input representing a handwriting of a user of the system for handwriting-to-text-summarization
120 recognizing a text in the handwriting input
121 segment the text into one or more portions
130 extracting at least one dynamic feature of the handwriting from the handwriting input
140 generating a text summary of the text
141 applying the one or more portions of the text to an importance classifier
142 applying the one or more dynamic features for each portion of the text to at least one quality classifier
143 applying a portion ranking algorithm
150 applying the text summary to a style transfer algorithm 160 applying the text summary to a font modification algorithm
170 applying the text summary to an annotation algorithm
180 applying the text summary to a collation algorithm
190 displaying the text summary via a graphical output of the user interface of the system for handwriting-to-text-summarization
200 system for handwriting-to-text-summarization
210 user interface
220 capturing subsystem
221 writing utensil
222 motion sensor module
230 graphical output
240 communication interface

The invention claimed is:

1. A computer-implemented method for handwriting-to-text-summarization, comprising:
   obtaining, via a user interface of a system, a handwriting input representing a handwriting of a user of the system for the handwriting-to-text-summarization;
   recognizing a text in the handwriting input;
   extracting at least one dynamic feature of the handwriting from the handwriting input;
   generating a text summary of the text, wherein generating the text summary is based on the text and on the at least one dynamic feature of the handwriting;
   applying the text summary to a collation algorithm configured for comparing the text summary to one or more further text summaries corresponding to one or more further users of one or more further systems for the handwriting-to-text-summarization; and
   sampling a collated text summary based on information about the user and on information about the one or more further users, thereby modifying the text summary.

2. The computer-implemented method of claim 1, wherein the at least one dynamic feature comprises an average writing pressure, an average stroke length, an average stroke duration, or a combination thereof, and wherein averaging is over the text or portions thereof.

3. The computer-implemented method of claim 2, wherein extracting the at least one dynamic feature of the handwriting from the handwriting input comprises applying the handwriting input to a handwriting dynamics algorithm configured to extract the at least one dynamic feature from the handwriting input.

4. The computer-implemented method of claim 3, wherein the handwriting dynamics algorithm is further configured to compute one or more of the average writing pressure, the average stroke length, the average stroke duration, or a combination thereof, wherein the averaging is over the text or portions thereof, thereby producing the at least one dynamic feature for the text or for each portion thereof.

5. The computer-implemented method of claim 1, wherein the handwriting input comprises a first set of data representing the text.

6. The computer-implemented method of claim 5, wherein recognizing the text in the handwriting input comprises applying the handwriting input to a text pre-processing algorithm configured to recognize the text represented by the handwriting input.

7. The computer-implemented method of claim 6, wherein the text pre-processing algorithm is further configured to segment the text into one or more portions.

8. The computer-implemented method of claim 7, wherein generating the text summary of the text based on the text and on the at least one dynamic feature of the handwriting comprises applying the text and the at least one dynamic feature to a text summarization algorithm configured to generate the text summary of the text.

9. The computer-implemented method of claim 8, wherein the text summarization algorithm comprises applying the one or more portions of the text to an importance classifier configured to classify each portion of the text in terms of at least two classes indicating different levels of importance.

10. The computer-implemented method of claim 6, wherein the text pre-processing algorithm comprises or is a machine-learning algorithm pre-trained for handwriting-to-text recognition and/or text segmentation.

11. The computer-implemented method of claim 6, wherein the text pre-processing algorithm is configured to segment the first set of data into individual character vectors and apply a pre-determined vector-to-character mapping to output the text.

12. The computer-implemented method of claim 1, wherein the handwriting input comprises a second set of data representing properties of the handwriting that indicate information about the user as the handwriting progresses.

13. The computer-implemented method of claim 1, further comprising:
   applying the text summary to a style transfer algorithm configured to modify the text summary so as to reflect the information about the user.

14. The computer-implemented method of claim 1, further comprising:
   applying the text summary to a font modification algorithm configured to change the font of at least one portion of the text summary based on the information about the user.

15. The computer-implemented method of claim 1, wherein the handwriting input comprises a first set of data representing the text.

16. A system for handwriting-to-text-summarization, comprising a user interface comprising a capturing subsystem configured to capture a handwriting of a user of the system, wherein the system is configured for:
   obtaining, via the user interface of the system, a handwriting input representing the handwriting of the user of the system for the handwriting-to-text-summarization;
   recognizing a text in the handwriting input;
   extracting at least one dynamic feature of the handwriting from the handwriting input;
   generating a text summary of the text, wherein generating the text summary is based on the text and on the at least one dynamic feature of the handwriting;
   applying the text summary to a collation algorithm configured for comparing the text summary to one or more further text summaries corresponding to one or more further users of one or more further systems for the handwriting-to-text-summarization; and
   sampling a collated text summary based on information about the user and on information about the one or more further users, thereby modifying the text summary.

17. The system of claim 16, further comprising:
   a communication interface to couple to one or more systems for the handwriting-to-text-summarization.

18. The system of claim 16, wherein the at least one dynamic feature comprises an average writing pressure, an average stroke length, an average stroke duration, or a combination thereof, and wherein averaging is over the text or portions thereof.

19. A method for handwriting-to-text-summarization, comprising:
   obtaining, via a user interface of a system, a handwriting input representing a handwriting of a user of the system for the handwriting-to-text-summarization;
   recognizing a text in the handwriting input, wherein the text is semantically and/or linguistically interpretable with respect to at least one communication language;
   extracting at least one dynamic feature of the handwriting from the handwriting input, wherein the handwriting input comprises a first set of data representing the text;
   generating a text summary of the text, wherein generating the text summary is based on the text and on the at least one dynamic feature of the handwriting;
   applying the text summary to a collation algorithm configured for comparing the text summary to one or more further text summaries corresponding to one or more further users of one or more further systems for the handwriting-to-text-summarization; and
   sampling a collated text summary based on information about the user and on information about the one or more further users, thereby modifying the text summary.

20. The method of claim 19, wherein the at least one dynamic feature comprises an average writing pressure, an average stroke length, an average stroke duration, or a combination thereof, and wherein averaging is over the text or portions thereof.

* * * * *